United States Patent Office 3,679,395
Patented July 25, 1972

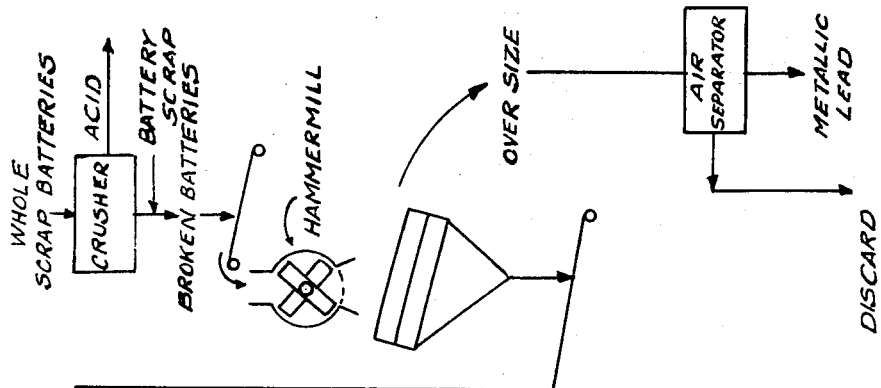
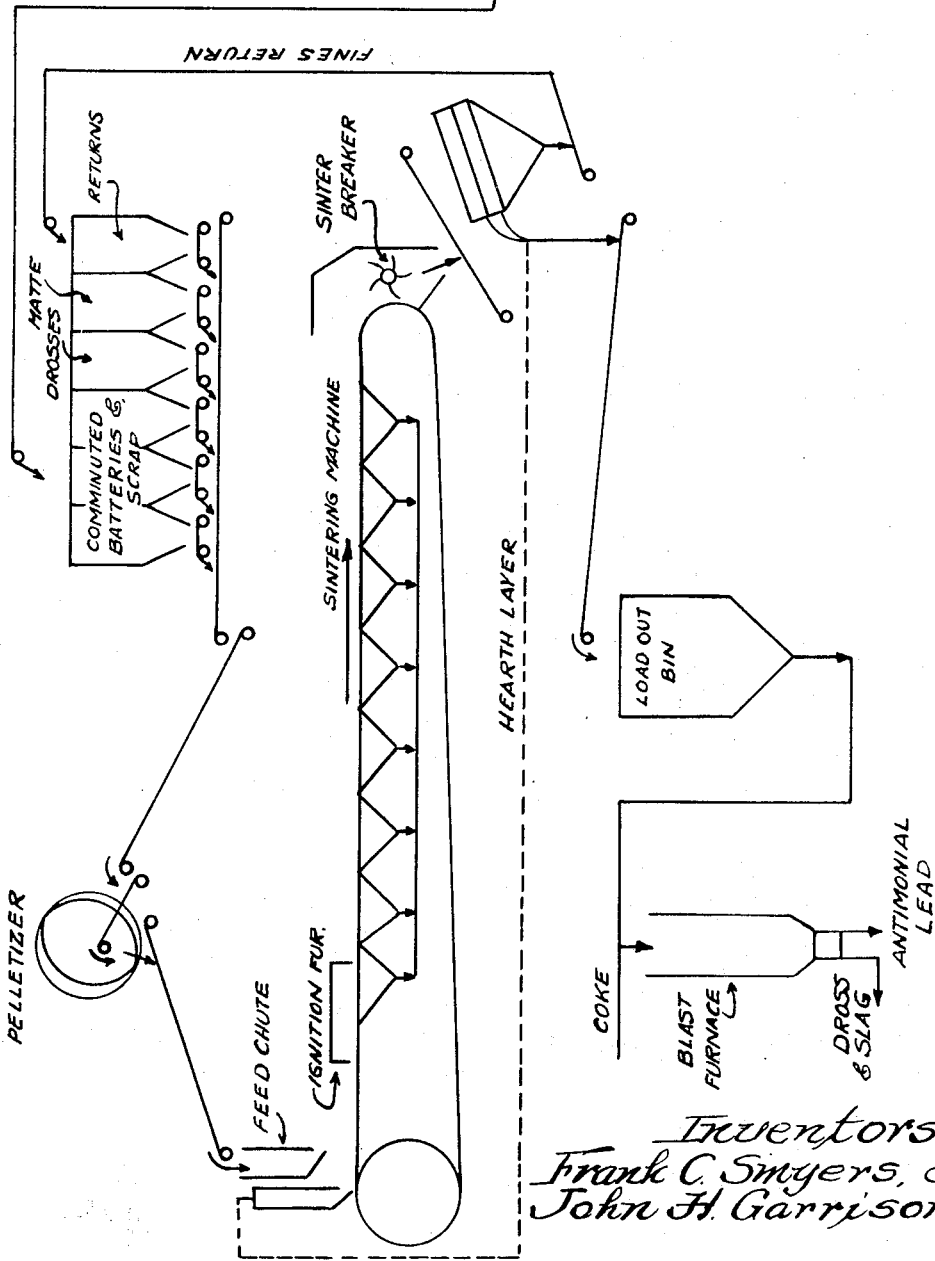

3,679,395
PROCESS FOR RECOVERING LEAD, LEAD ALLOYS, AND LEAD COMPOSITIONS FROM BATTERIES
Frank C. Smyers, Munster, and John H. Garrison, Griffith, Ind., assignors to United States Smelting, Refining & Mining Company, New York, N.Y.
Filed July 27, 1970, Ser. No. 58,474
Int. Cl. C22b 13/00
U.S. Cl. 75—77     14 Claims

ABSTRACT OF THE DISCLOSURE

The improved process for recovering lead and other metallic components from whole storage batteries and/or battery scrap generally involves the preparation of a unique feedstock which is useful as a charge for a blast furnace or other reducing apparatus. This unique feedstock is prepared, for example, by treating batteries or battery scrap to form a comminuted mass of battery particles, preparing a porous, pelletized bed of battery particles, and sintering the pelletized bed of battery particles for a time and under conditions sufficient to form an agglomerated sinter cake and to reduce or eliminate the sulfur content of the pelletized bed. The sinter cake is used alone or in combination with various other materials as a blast furnace charge.

BACKGROUND OF THE INVENTION

(1) Field of the invention

This invention relates generally to a process for recovering metals and the like from articles containing metals and combustible materials and more particularly to a process for recovering lead, lead alloys, lead compounds, and other metals such as antimony, tin, arsenic and copper from waste lead storage batteries or prepared lead battery scrap.

(2) Description of the prior art

It is well known that large quantities of lead and other valuable metallic components are available in waste lead storage batteries. As a consequence, a number of process techniques have been devised in an effort to recover lead, lead compounds, and other valuable metallic components from such used storage batteries.

In particular, it is known, for example, that metallic lead and lead compounds can be recovered from storage batteries by removing the internal components of a battery from the outer battery casing and then heating these lead-containing internal components to a temperature sufficient to both melt metallic lead and allow reclamation of lead in its molten state. Although such techniques have been widely used, they have generally proved ineffective in efficiently recovering the major proportion of metallic components contained in storage batteries.

It has been suggested, therefore, that whole batteries, including the outer battery casing, be burned so as to utilize the heat released from combustion of the casing to melt the metallic lead components in the batteries. Although such processes have been slightly more efficient in terms of lead recovery, they also have proved unsuccessful principally because the battery cases, which are made of rubber, tend to produce excessive amounts of smoke and air pollutants during combustion.

Finally, in an effort to further improve the overall lead recovery process, attempts have been made to use well-known smelting techniques, such as smelting lead in a blast furnace, in conjunction with other known storage battery treatment steps. Typically, for example, internal lead-containing components are first removed from a storage battery, processed into a blast furnace charge, and then passed into the furnace along with coke, limestone, slags, fluxes, and the like. Coke is generally used as a fuel for the furnace and air is blown through the bottom of the furnace which, in combination, causes reduction of oxidic lead components, such as lead oxide, lead silicates, and lead sulphates.

One of the more significant disadvantages resulting from the typical blast furnace recovery process is caused by the nature of the blast furnace feed itself. In an untreated state, the internal components of a storage battery make a rather poor blast furnace charge. For example, the use of such untreated feedstocks results in reduced blast furnace capacity, increased operating costs and fuel requirements, and more significantly, still results in the loss of large amounts of potentially recoverable lead. One specific reason for this relative inefficiency in lead recovery is caused by the large quantities of lead which are lost as matte. Another reason is the loss of lead through blast furnace by-products which are incapable of further processing. Finally, the failure to utilize the battery casings in the process eliminates a significant source of fuel and results in much larger coke requirements for furnace operation. Consequently, a significant need has developed for a new and improved process to efficiently recover metallic lead-containing materials from whole batteries and the like and to recover other metallic components such as antimony, tin, arsenic and copper.

SUMMARY OF THE INVENTION

The novel process of this invention obviates many of the deficiencies of prior art lead recovery processes. In particular, the process of this invention can be carried out by treating whole batteries or battery scrap to form a comminuted mass of battery particles, preparing a porous, pellitized bed of battery particles and then sintering the pelletized bed of particles for a time and under conditions sufficient to form an agglomerated sinter cake. In this way, a unique and vastly improved blast furnace charge material is made for use in facilitating the recovery of lead and other metals from batteries.

In addition, battery particles can be mixed with blast furnace by-products such as matte, drosses, and the like, prior to processing for the blast furnace.

Although a number of specific embodiments for the invention are disclosed herein, it should at least be noted that the treatment of whole batteries or battery scrap will at times involve the separation of battery particles into distinct oversize and undersize portions. When such a separation is made, only the undersize portion of particles is prepared into a porous, pelletized bed for use in sintering, while metallic lead contained in the oversized portion is mechanically separated from residual materials.

In addition, sintering is effected by simultaneously inducing a draft of air through the bed of battery particles and inducing a state of combustion in the bed for a time and under conditions sufficient to form an agglomerated sinter cake in which particles of battery casing serve as a fuel for the sintering process. Sintering is also carried out, however, to remove sulfur contained in the battery particles which, in turn, reduces the quantity of matte produced in the blast furnace operation. For example, a reduction in sulfur content to less than 1 percent by weight sulfur based upon the total weight of sinter cake is highly desirable during sintering.

Utilization of the process of this invention permits increases to be accomplished in the recovery of lead contained in batteries. For example, sintering of the comminuted mass of battery particles reduces the sulfur content of the ultimate blast furnace charge and, as a consequence, little or no matte is produced in the blast furnace operation. Since matte typically contains about two to five percent by weight of total lead contained in the whole batteries or scrap, excessive generation of matte (which is usually discarded as a waste by-product of the blast furnace operation) reduces the overall recovery efficiency of the lead reclamation process. In contrast, the process of this invention, by means of sintering the blast furnace feedstock, virtually eliminates matte production.

Furthermore, the presence of large quantities of sulfur in the blast furnace feed necessitates the use of offsetting quantities of metallic iron to react with free sulfur and thereby reduces the amount of lead tied up by sulfur. In the practice of this invention, sintering reduces the sulfur content of the blast furnace charge and, therefore, eliminates the necessity of using high cost metallic iron in the recovery process. By reducing the level of sulfur content in the blast furnace feed by sintering first, virtually no metallic iron is required.

At the same time, the use of whole batteries in the practice of this invention permits comminuted particles of battery casing to serve as a fuel for the sintering process, which eliminates the necessity for using coke or other fuels during sintering. Finally, the preparation of blast furnace feed through sintering results in vastly improved blast furnace capacity, simplifies metallurgical control and reduces manpower requirements.

BRIEF DESCRIPTION OF THE DRAWINGS

The process of this invention will be more readily understood by reference to the drawings which diagrammatically illustrates one embodiment of the overall lead recovery process, identifying both the equipment used in the process and the principal details of the preparation of a unique blast furnace feedstock.

DESCRIPTION OF THE PREFERRED EMBODIMENTS

As shown in the drawing, the lead recovery process of this invention generally involves the treatment of whole lead storage batteries and battery scrap to form a comminuted mass of battery particles, preparing a porous, pelletized bed from the comminuted mass of particles which is suitable for sintering and then sintering the pelletized bed of particles until an agglomerated sinter cake, suitable for use as a feedstock for a blast furnace, is formed. After treatment in the blast furnace, oxidized metallic lead materials and other metals contained in the sinter cake are reduced to their elemental state or alloy form.

The starting materials used in the practice of this invention include drained or undrained whole lead storage batteries, battery scrap materials, such as battery tops and plates, and various other lead-containing materials. It should be recognized, however, that many other metallic materials are also suitable for use in the practice of this invention when it is desired to recover metallic components other than lead.

In addition, other materials which can be used at intermediate stages in the overall process of this invention include drosses, such as metallic oxides, sulfides and sulfates, either purchased or as a by-product of the blast furnace operation, fluxes, such as iron oxides, limestone, silica, aluminum oxide, magnesium oxide, and the like, slag, such as $SiO_2$, $CaO$, $FeO$ and $Al_2O_3$, and matte, such as $PbS$ and $FeS$.

A first step in the lead recovery process of this invention is the treatment of whole batteries and/or battery scrap in the manner sufficient to form a mass of comminuted battery particles. As shown in the drawing, this treatment operation can involve several separate and distinct steps. For example, whole batteries, containing acid, can be initially fragmentized in a corrugated or studded roll crusher. This initial fragmentation breaks the batteries into a number of pieces and permits the liquid acid contained in the batteries to be removed.

Since the acid contained in most lead storage batteries is sulfuric acid it is quite advantageous to remove acid before further treatment for lead recovery. This is true primarily because the sulfur present in sulfuric acid tends to tie-up recoverable lead and greatly complicate the ultimate lead recovery process. Accordingly, the removal of acid before further processing although not an essential step in the process, is nevertheless highly desirable because it simplifies the overall lead removal process and makes it much more efficient. Typically, the fragmented batteries are suspended on a screen of sufficient size to hold the battery fragments while allowing acid to flow through screen opening.

As a second step in the treatment process, the fragmented battery pieces are further processed in a hammermill, a roller or the like, until a comminuted mass of battery particles is obtained. A grid arranged at the bottom of the hammermill determines the ultimate size of the battery particles produced. After passing through the hammermill, the comminuted mass of battery particles can be used directly in the next step of the lead removal process or can be further separated into oversize and undersize portions by means of a screen separator or the like.

In order to improve the lead recovery operation, it is desirable to separate the comminuted mass of battery particles into separate fractions. Separation is accomplished by means of a screen separator which is sized in such a manner as to strike a balance between removing large quantities of free metallic lead and battery casing material from further processing (fuel) for the sintering operation. Typically, screen sizes in the range of about ⅛ inch to 1 inch are effective in accomplishing a proper separation. However, it has been found that a screen size of ¼ inch is especially desirable since approximately 70 percent by weight of the free metallic lead contained in the comminuted battery is greater than ¼ inch in size. In addition, since the battery casings are typically constructed from rubber or plastics such as polypropylene and are, consequently, not easily fragmented, a large percentage of the battery casing can also be removed in the oversize portion of the comminuted battery.

In actual operation of the process of this invention, the undersize fraction of battery particles typically represent about 75 percent by weight of the total comminuted battery particles. This undersized fraction, moreover, provides an excellent balance between adequate battery casing particles, i.e., rubber, for use as a fuel in the sintering operation and metallic components and lead.

The oversized fraction of comminuted battery particles, on the other hand, are transmitted to an air separator which effects a separation between metallic lead and casing materials. Typically, the oversize stream is passed by gravity flow through an air stream directed perpendicular to the direction of flow of the oversize stream. In this way, the lighter battery casing particles are carried away by the air stream while the heavier lead particles drop through the air stream and are recovered. The air flow, of course, is adjusted to provide maximum separation. By this air separation technique, approximately 70 percent by weight of the free metallic lead contained in the whole batteries is removed without further processing.

After treatment of the whole batteries and battery scrap to form a mass of comminuted particles and after separation of the particles into distinct fractions, the undersize stream of particles is made into a porous, pelletized bed suitable for sintering. In particular, the comminuted battery particles are passed directly onto a conveyor as shown in the drawing and then to an inclined rotary pan or disk where pelletization occurs. Pelletization is highly desirable in the sintering operation, since the rate of sintering can be carefully controlled when a porous, pelletized, uniformly-sized plurality of particles constitute the sintering bed.

Although the comminuted battery particles can alone be used in sintering operation, it is sometimes desirable to blend the battery particles with dross, matte, slag, and sintered reruns as shown in the drawing. This blending is accomplished by feeding metered amounts of individual sintering burden constituents, including the comminuted battery particles, from proportioning bins onto a conveyor. Typically, it is desirable in the practice of this invention to blend the materials as follows:

| Battery particles: | Percent by weight |
|---|---|
| Dross | 50 to 80 |
| Matte | 15 to 20 |
| Returns | 0 to 30 |

From the conveyor, the blend of sintering materials are passed to an inclined pan, disk, or drum for pelletization. The pelletized sintering materials are then discharged directly onto a series of pallets supported on another conveyor in the form of a porous, pelletized bed suitable for sintering.

Actual preparation of the porous, pelletized bed of battery particles for sintering can be carried out in several ways. One technique for bed preparation involves the initial deposit of a hearth layer of sized, re-cycled sinter product on the conveyor pallets. Typically, this initial layer is maintained at a depth of about 4 inches and serves as a quench and collection zone for molten lead. A second layer, designated as an ignition layer, composed solely of pelletized battery materials or blended battery materials is then deposited on the hearth layer. Normally, the depth of the ignition layer is maintained at about 3 to 5 inches. Lastly, an active or top layer made up of the same pelletized materials used for the ignition layer is deposited on top of the ignition layer. Alternatively, the hearth layer can be eliminated and a simple two-layer structure, i.e., ignition layer and active layer, can be used in the sintering step. Moreover, a single layer of pelletized battery materials can also be employed.

In any case, sintering of the porous, pelletized bed of battery particles is carried out by simultaneously inducing a flow of air through the bed and igniting the bed by means of an ignition apparatus, such as an ignition torch. Combustion then takes place in the bed for a time and under conditions sufficient to render the bed into an agglomerated sinter cake desirably containing less than one percent by weight sulfur. Chemically, the combustion which occurs during the sintering process has the effect of oxidizing sulphide lead contained in the sintered material and of driving off any sulfur contained in the material as sulfur dioxide.

In particular, the ignition layer (if present) is first ignited under a downdraft flow of air at a rate of about 75 to 150 s.c.f.m./ft.$^2$ of bed surface for a period of about 45 to 120 seconds and at a temperature of about 1800° F. to 2000° F. Following ignition, a downdraft flow is maintained for about one to three minutes to promote formation of a suitable combustion zone. Then, as the active layer is placed on top of the ignition layer, the flow direction of air is reversed to updraft. At an undraft flow rate of 50 to 100 s.c.f.m./ft.$^2$ of surface, combustion can be maintained until the materials are agglomerated into a cellular mass or sinter case.

When a single layer of pelletized battery particles is sintered, the top portion of the porous, pelletized bed is simultaneously ignited and subjected to a downdraft flow of air at flow rates in the range of about 100 to 200 s.c.f.m./ft.$^2$ of surface. The ignition period is normally about 30 to 120 seconds, after which a downdraft flow of air maintained to complete the sintering process.

It should be understood that either a one, two, or three-layered bed or an upward flow of air can be successfully employed in the practice of this invention. Normally, however, the sintering process is preferably carried out with an upwardly directed flow of air because such an upward draft tends to fluidize rather than compact the bed of sinter material and improve the overall process efficiency. In addition, it is preferred to use air flow rates of about 75 to 150 s.c.f.m./ft.$^2$ of surface when an upwardly directed flow of air is employed and flow rates of about 100 to 200 s.c.f.m./ft.$^2$ when a downwardly directed flow of air is used in the sintering process.

After agglomeration of the bed and formation of the sinter cake occurs, the cake is passed through a sizing screen and then used as a charge material for a blast furnace. Typically, the sinter cake is combined with a carbonaceous reducing fuel, such as coke, which, together, are used as a charge for a blast furnace. It has been observed that blast furnace coke requirements are reduced by about 25 to 40 percent as a result of the feed preparation discussed herein. In addition, the fact that an agglomerated sinter cake is used as a charge material vastly reduced the amount of dust present in the furnace and, as a consequence, decreases the initial size and cost of dust collection systems usually used and reduces the potential of fire hazards. It has also been noted that reduced quantities of dross and matte are generated during the blast furnace operation, and the overall percentage recovery of lead is increased.

Although a number of specific embodiments for the process of this invention have been described herein, it should be understood that other modifications of these embodiments can be made without departing from the spirit and scope of the invention.

We claim:

1. A process for recovering lead from whole lead storage batteries and battery scrap comprising the steps of:
    fragmentizing said whole batteries and battery scrap to form a comminuted mass of battery particles, said mass including particles of metallic battery parts and nonmetallic battery casing;
    forming said comminuted mass of battery particles into a plurality of pelletized particles and arranging said pelletized particles into a porous pelletized bed;
    sintering said pelletized bed of battery particles by simultaneously inducing a draft of air through said bed and inducing a state of combustion in said bed for a time sufficient to permit said bed to form an agglomerated sinter cake, said particles of nonmetallic battery casing acting as a fuel and providing heat of combustion for the sintering of said pelletized bed;
    changinng a blast furnace with said sinter cake and a carbonaceous reducing fuel; and
    effecting the reduction of oxidized lead compositions contained in said sinter cake to elemental lead.

2. The process of claim 1 wherein the sintering of said pelletized bed of battery particles is carried out for a time sufficient to reduce the sulfur content of said bed to less than 1 percent by weight sulfur.

3. The process of claim 2 wherein blast furnace by-produced drosses, matte and slag are mixed with said comminuted mass of battery particles before said porous, pelletized bed is prepared.

4. The process of claim 1 wherein said draft of air is induced upwardly through said bed of battery particles.

5. The process of claim 1 wherein said draft of air is induced downwardly through said bed of battery particles.

6. The process of claim 1 wherein said comminuted mass of battery particles is first pelletized and then formed into two separate layers, one of said layers forming an ignition layer and the other of said layers forming a porous pelletized bed of battery particles, and wherein a draft of air is induced upwardly through said ignition layer and said bed of battery particles during sintering.

7. The process of claim 6 wherein the flow rate of said draft of air through said bed of battery particles is maintained at about 75 to 150 s.c.f.m. per ft.$^2$ of bed surface.

8. The process of claim 1 wherein the treatment of said whole batteries to form a comminuted mass of battery particles comprises:

fragmenting said whole batteries into a plurality of particles;

separating said plurality of particles into particles greater than ¼ inch in size and smaller than ¼ inch in size; and whereby said porous pelletized bed of battery particles is prepared solely from those particles smaller than ¼ inch in size.

9. In the process for recovering lead and lead compositions from whole lead batteries or lead battery scrap by charging a blast furnace with material containing oxidized lead and effecting the reduction of said oxidized lead materials to lead in said blast furnace, the improvement comprising preparing a unique charge for said blast furnace by the steps which comprise:

fragmenting said whole batteries and battery scrap into a comminuted mass of battery particles;

separating said battery particles into a metallic lead rich oversize portion containing particles greater than about ¼ inch in size and an undersize portion less than ¼ inch in size;

preparing a porous pelletized bed of battery particles from the undersize portion; and sintering said pelletized bed or battery particles by simultaneously inducing a draft of air through said bed and inducing a state of combustion in said bed for a time sufficient to form an agglomerated sinter cake.

10. The process of claim 9 wherein free metallic lead in said oversize portion of said battery particles in air separated from particles of battery casing and other waste materials.

11. The process of claim 9 wherein the sintering of said pelletized bed of battery particles is carried out for a time sufficient to reduce the sulfur content of said bed to less than 1 percent by weight sulfur, particles of battery casing serving as a fuel for said sintering.

12. The process of claim 11 wherein said draft of air is induced upwardly through said bed of battery particles at a flow rate of about 75 to 150 s.c.f.m. per ft.$^2$ of bed surface.

13. The process of claim 11 wherein said draft of air is induced downwardly through said bed of battery particles at a flow rate of about 100 to 200 s.c.f.m. per ft.$^2$ of bed surface.

14. The process of claim 11 wherein dross and slag by-products from said blast furnace and matte and fluxes are mixed with said comminuted mass of battery particles before said porous, pelletized bed is prepared and wherein said sinter cake formed from the sintering of said pelletized bed is combined with a carbonceous reducing fuel, whereby said combined reducing fuel and sinter cake are charged to said blast furnace.

References Cited

UNITED STATES PATENTS

| | | | |
|---|---|---|---|
| 2,226,490 | 3/1958 | Neumann | 75—77 |
| 2,146,294 | 2/1939 | Hayward | 75—77 |
| 3,393,876 | 7/1968 | Elmore | 75—77 X |
| 3,300,043 | 1/1967 | Adsit | 75—77 UX |

FOREIGN PATENTS

| | | | |
|---|---|---|---|
| 574,935 | 4/1959 | Canada | 75—77 |

HERBERT T. CARTER, Primary Examiner

U.S. Cl. X.R.

75—78, 44S, 69, 72, 85, 149, 135; 23—209

UNITED STATES PATENT OFFICE
CERTIFICATE OF CORRECTION

Patent No.  3,679,395          Dated  July 25, 1972

Inventor(s)  Frank C. Smyers and John H. Garrison

It is certified that error appears in the above-identified patent and that said Letters Patent are hereby corrected as shown below:

Column 5, line 67, after "air" add --is--.

Column 6, line 46, "changinng" should read --charging--.

Column 7, line 24, after "bed" change "or" to read --of--.

Signed and sealed this 26th day of December 1972.

(SEAL)
Attest:

EDWARD M. FLETCHER, JR.              ROBERT GOTTSCHALK
Attesting Officer                     Commissioner of Patents